United States Patent
Van Leeuwen et al.

(10) Patent No.: US 6,411,030 B1
(45) Date of Patent: Jun. 25, 2002

(54) PLASMA DISPLAY WITH DISCHARGE MEDIUM CONTAINING HYDROGEN OR A HYDROGEN ISOTOPE

(75) Inventors: Gerrit H. Van Leeuwen; Udo Van Slooten, both of Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/096,695

(22) Filed: Jun. 12, 1998

(30) Foreign Application Priority Data

Jun. 12, 1997 (EP) .............................................. 97201782

(51) Int. Cl.[7] .................................................. H01J 17/49
(52) U.S. Cl. ........................ 313/582; 313/586; 313/495
(58) Field of Search ................................ 313/567, 568, 313/570, 572, 573, 574, 575, 576, 577, 581, 582, 583, 584, 585, 586, 587

(56) References Cited

U.S. PATENT DOCUMENTS

| | | | | |
|---|---|---|---|---|
| 3,916,245 A | * | 10/1975 | Dorf et al. | ................... 313/486 |
| 3,925,703 A | * | 12/1975 | Schermerhron | ....... 315/169 TV |
| 4,048,533 A | * | 9/1977 | Hinson et al. | ............... 313/188 |
| 4,126,807 A | * | 11/1978 | Wedding et al. | ............. 313/188 |
| 5,596,431 A | | 1/1997 | Bongaerts et al. | ............. 349/32 |
| 5,948,228 A | * | 9/1999 | Hinchliffe et al. | .......... 204/485 |

FOREIGN PATENT DOCUMENTS

| EP | 0780874 A2 | | 6/1997 |
|---|---|---|---|
| EP | 0 780 874 A2 | * | 6/1997 |

* cited by examiner

Primary Examiner—Nimeshkumar D. Patel
Assistant Examiner—Mariceli Santiago
(74) Attorney, Agent, or Firm—Ernestine C. Bartlett

(57) ABSTRACT

A display device comprising channels (30, 30', 30") containing an ionizable gas (33), and walls of the channels (30, 30', 30") being provided with row electrodes (31, 32) for selectively ionizing the ionizable gas (33) during operation. The display device is further provided with an electro-optical layer (35) and means for activating said electro-optical layer (35). The display device is characterized in that the ionizable gas (33) contains a carrier gas and an additional gas, said additional gas comprising deuterium or deuterium hydrogen, or hydrogen and a further gas having a higher molecular weight. Preferably, helium or nitrogen is used as the carrier gas, and the additional gas comprises deuterium or deuterium hydrogen, or hydrogen and nitrogen, or hydrogen and xenon.

14 Claims, 3 Drawing Sheets

PLASMA DISPLAY WITH DISCHARGE MEDIUM CONTAINING HYDROGEN OR A HYDROGEN ISOTOPE

BACKGROUND OF THE INVENTION

The invention relates to a display device comprising at least one compartment containing an ionizable gas, walls of the compartment being provided with electrodes for selectively ionizing the ionizable gas, during operation, and comprising an electro-optical layer of an electro-optical material, and means for activating portions of the electro-optical layer.

Display devices for displaying monochromatic or color images include plasma-addressed liquid-crystal display devices, the so-called PALC-displays, which are preferably thin-type displays. PALC-displays are used as television and computer displays.

A display device of the type mentioned in the opening paragraph is disclosed in U.S. Pat. No. 5,596,431. The thin-type display device described in said document comprises a display screen having a pattern of (identical) so-called data storage or display elements and a plurality of compartments. Said compartments are filled with an ionizable gas and provided with electrodes for (selectively) ionizing the ionizable gas during operation. In the known display device, the compartments are mutually parallel, elongated channels (formed in a so-called channel plate), which serve as selection means for the display device (the so-called plasma-addressed row electrodes). The application of a voltage difference across the electrodes in one of the channels of the channel plate, causes electrons to be emitted (from the cathode), which electrons ionize the ionizable gas, thereby forming a plasma (plasma discharge). If the voltage across the electrodes in one channel is switched off and the gas de-ionized, a subsequent channel is energized. At the display-screen side of the display device, the compartments are sealed by a (thin) dielectric layer ("microsheet") provided with a layer of an electro-optical material and further electrodes serving as the so-called data electrodes are column electrodes of the display device. Said further electrodes are provided on a substrate. The display device is formed by the assembly of the channel plate with the electrodes and the ionizable gas, the dielectric layer, the layer of the electro-optical material and the further electrodes.

A disadvantage of the known display device resides in that the plasma-discharge cycle of such display devices is not optimal.

SUMMARY OF THE INVENTION

It is an object of the invention to provide, inter alia, a display device having an improved plasma-discharge cycle.

To achieve this, the display device in accordance with the invention is characterized in that the ionizable gas comprises a carrier gas and an additional gas, said additional gas containing deuterium or deuterium hydrogen, or said additional gas containing hydrogen and a further gas having a higher molecular weight.

At the beginning of a plasma-discharge cycle in the display device, a plasma discharge is created in the compartment or in one of the compartments (for example the channels of a PALC-display) by applying a (relatively high) voltage pulse (the so-called "strobe" pulse) across the electrodes in the compartment. Charged particles are created in such a plasma discharge. The voltage across and the current through the discharge reach a stationary state (the so-called "steady state") within a few us. After switching off the plasma discharge, the grey level of each display element is checked by applying a (relatively low) voltage across the corresponding further electrode (the data electrode or the column electrode). As a result, a part of the charged particles is drawn towards the (thin) dielectric layer ("microsheet"), which causes an electric field to be formed across the electro-optical layer. As a result, the electro-optical layer is charged like a capacitor until the complete data voltage is present across the layer, causing the transparency of the electro-optical layer to change (for example, it becomes more or less transparent). The degree of transparency is determined by the value of the data voltage. After the discharge has disappeared in the so-called "afterglow", the compartment forms an insulator and the electro-optical layer remains charged. A new plasma discharge in the compartment acts as a reset of the display element.

In general, the display device comprises a number of compartments, each compartment including at least two electrodes for ionizing the gas.

Important parameters of the plasma-discharge cycle of the display device are the electric conductivity of the plasma discharge and the decay of the conductivity in the afterglow period. If the decay in conductivity of the plasma discharge takes place too slowly, the discharge may continue while a next data line is already being written, which is undesirable. Too rapid a decay of the conductivity also has adverse effects.

The (carrier) gas which is most commonly used in display devices of the type mentioned in the opening paragraph is helium (He). The ignition voltage of the plasma discharge can be reduced by adding small quantities of a gas (of the order of a few percent) to the helium. In general, the ionization potential of such gases is lower than that of helium. The resultant gas mixtures are referred to as Penning mixtures. A well-known additional gas is hydrogen ($H_2$). The use of such gas mixtures does not only influence the ignition characteristic of the plasma discharge but also, for example, the current necessary to maintain the discharge (the so-called sustain current) as well as the afterglow characteristic of the discharge.

The inventors have recognized that the properties of the plasma-discharge cycle of the display device can be influenced by suitably selecting (the composition of) the additional gas. In a first embodiment of the invention, the additional gas comprises deuterium ($D_2$) or deuterium hydrogen (HD), which causes the ignition and sustain voltages of the plasma discharge as well as the afterglow decay time of the plasma discharge to be influenced. The addition of gases having a larger effective cross-section and a higher molecular weight, such as $D_2$ or HD, additionally causes the out-diffusion of the additional gas to be effectively reduced. The small molecule hydrogen has a relatively high diffusion rate through the (glass) walls of the display device, and diffusion takes place, in particular, through the dielectric layer ("microsheet") which seals the compartment and which generally has a thickness of approximately only 50 μm. In a second embodiment of the invention, the additional gas consists of hydrogen and a further gas having a higher molecular weight, resulting in an additional parameter by means of which the properties of the plasma discharge can be influenced.

In a preferred gas mixture for a display device in accordance with the first embodiment of the invention, helium (He) or nitrogen ($N_2$) is the carrier gas, and the additional gas comprises either deuterium ($D_2$) or deuterium hydrogen (HD). Further, nitrogen ($N_2$) or xenon (Xe) may be added to the additional gas.

In a preferred gas mixture for a display device in accordance with the second embodiment of the invention, helium (He) is the carrier gas, and the additional gas comprises hydrogen ($H_2$) and nitrogen ($N_2$), or hydrogen ($H_2$) and xenon (Xe). Further, hydrogen ($H_2$) may be at least partly replaced by deuterium ($D_2$) or deuterium hydrogen (HD).

These and other aspects of the invention will be apparent from and elucidated with reference to the embodiments described hereinafter.

BRIEF DESCRIPTION OF THE DRAWINGS

In the drawings.

The Figures are purely schematic and not drawn to scale. In particular for clarity, some dimensions are exaggerated strongly. In the Figures, like reference numerals refer to like parts, whenever possible.

DETAILED DESCRIPTION OF THE PREFERRED EMBODIMENTS

Figure 1:
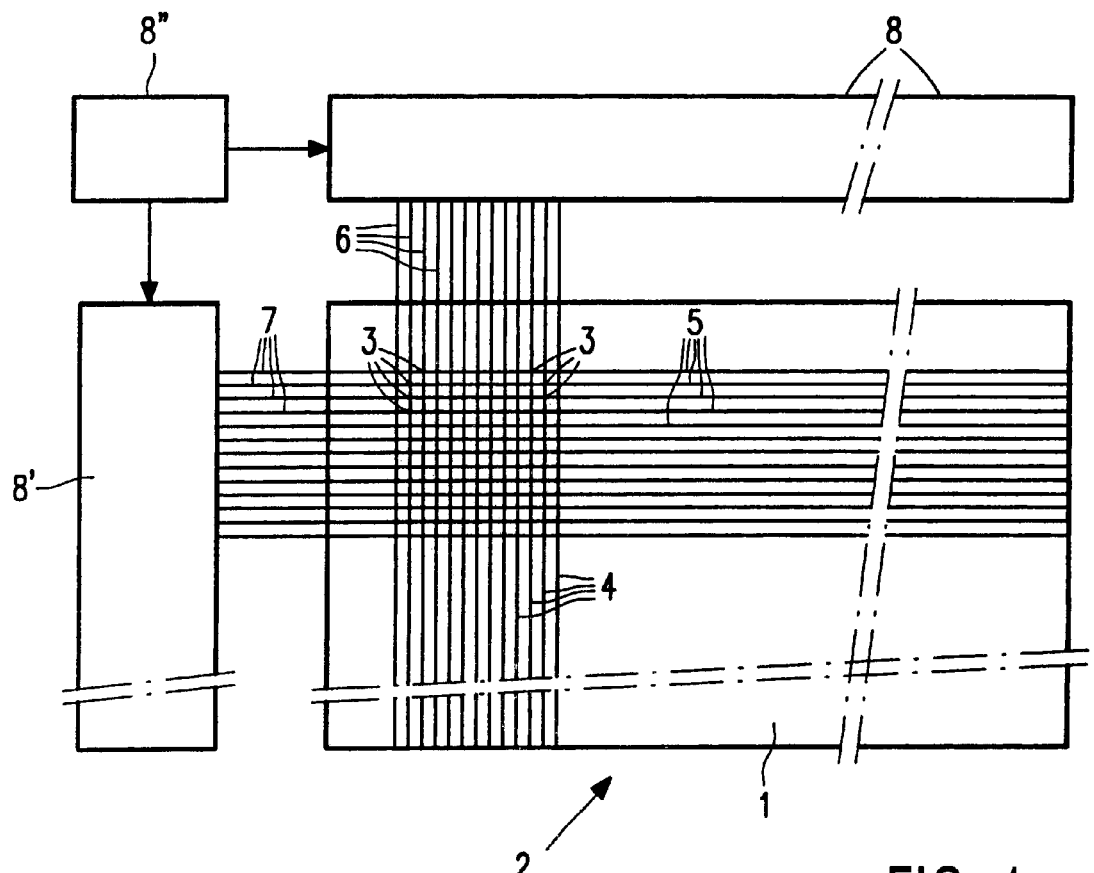
FIG. 1 schematically shows a block diagram of a display device.

FIG. 1 very schematically shows a block diagram of a conventional display device. Said display device comprises a substrate 1 with a surface 2 which is provided with a pattern of pixels which are separated from each other (the space between the pixels being predetermined) in the vertical and the horizontal direction. Each pixel 3 comprises overlapping portions of (thin, narrow) electrodes 4 of a group of electrodes arranged in vertical columns and of (thin, narrow) electrodes 5 of a further group of electrodes arranged in horizontal rows. The electrodes 4 of the group of electrodes are also referred to as column electrodes, and the electrodes 5 of the further group of electrodes are also referred to as row electrodes. In a plasma-addressed liquid-crystal display device (PALC), the rows are formed by long, narrow channels (the compartments). The pixels 3 in each of the rows of electrodes (channels) 5 represent one data line.

The width of the electrodes 4, 5 determines the dimensions of the pixels 3, which are typically rectangular in shape. Electrodes 4 receive (analog) drive signals ("data drive signals") from a drive circuit 8 via parallel conductors 6, and electrodes 5 receive (analog) drive signals ("data drive signals") from a drive circuit 8' via parallel conductors 7.

To produce a picture or a data-graphic display in a relevant region of the surface 2 of substrate 1, the display device employs a control circuit 8" ("scan control circuit") which controls the drive circuits 8, 8'. In the display device, various types of electro-optical materials may be used. Examples of electro-optical materials include (twisted) nematic or ferro-electric liquid-crystal materials. In general, the electro-optical materials attenuate the transmitted or reflected light in dependence upon a voltage applied across the material.

Figure 2:
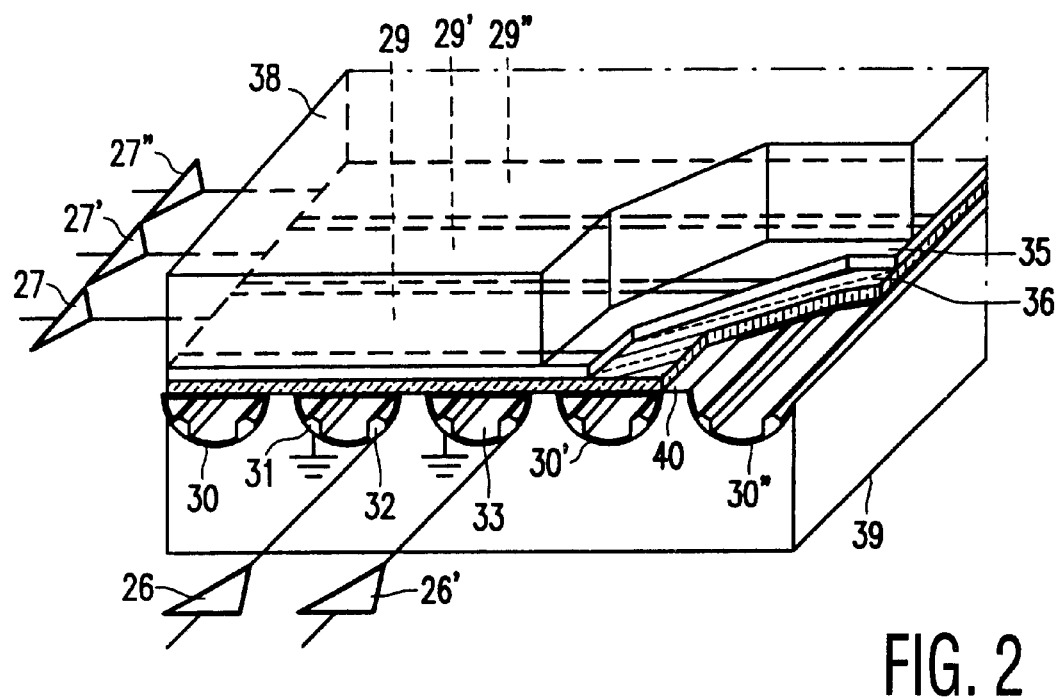
FIG. 2 is a schematic, perspective view, partly cut away, of a part of a construction of a plasma-addressed liquid-crystal display device (PALC) in accordance with the invention.

FIG. 2 is a schematic, perspective view, partly cut away, of a part of a construction of a plasma-addressed liquid-crystal display device (PALC) in accordance with the invention comprising a first substrate 38 and a second substrate 39. In FIG. 2, only three column electrodes 29, 29', 29" are shown. The row electrodes 30, 30', 30" which serve as selection means are formed by a number of mutually parallel elongated channels (compartments), situated under a layer 35 of an electro-optical material. The panel comprises electric connections to the column electrodes 29, 29', 29" and to the plasma electrodes 31, 32, said column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each of the (plasma)channels 30, 30', 30" is filled with an ionizable gas 33 comprising a gas mixture of a carrier gas and an additional gas, which (plasma)channels 30, 30', 30" are sealed by a thin dielectric layer ("microsheet") 36 which is made, for example, of glass. Each of the compartments (the channels) is provided at an inner surface (wall) with first and second elongated electrodes 31, 32 extending throughout the length of the channel. The second electrode 32 is referred to as the anode and a pulsed voltage, a so-called "strobe pulse", is applied to said anode, causing electrons emitted from the cathode 31 to ionize the gas, thereby forming a plasma. In an alternative embodiment, a negative (direct-current) pulse is applied to the cathode. The next channel is not energized until after the "strobe pulse" has ended and the gas is de-ionized. To reduce the duration of the cycle, the next channel is generally ionized already before the preceding channel has been (completely) de-ionized. The column electrodes 29, 29', 29" each cross an entire column of pixels, so that, in order to preclude crosstalk, the number of plasma row connections per unit of time is limited to only one.

In such display devices, helium (He) is generally used as the main constituent (carrier gas) of the ionizable gas 33. In an alternative embodiment, nitrogen ($N_2$) is used as the carrier gas. The ignition voltage of the plasma discharge can be reduced by adding small quantities of a gas (of the order of 0.1–3%) to the helium (or nitrogen). A well-known gas which is added to the carrier gas to form so-called Penning mixtures is hydrogen ($H_2$). The use of such gas mixtures causes the properties of the plasma discharge to be influenced.

In accordance with the invention, the additional gas comprises deuterium ($D_2$) or deuterium hydrogen (HD), or it comprises hydrogen ($H_2$) and a further gas having a higher molecular weight, such as nitrogen ($N_2$) or xenon (Xe). Table I shows the ionization potential of various gases.

TABLE I

| Ionization potentials of different gases. | | | | | |
| --- | --- | --- | --- | --- | --- |
| gas | He | $H_2$ | $D_2$ | HD | $N_2$ | $X_e$ |
| ionization potential (eV) | 24.6 | 15.4 | 15.5 | 15.5 | 15.6 | 12.1 |

Figure 3:
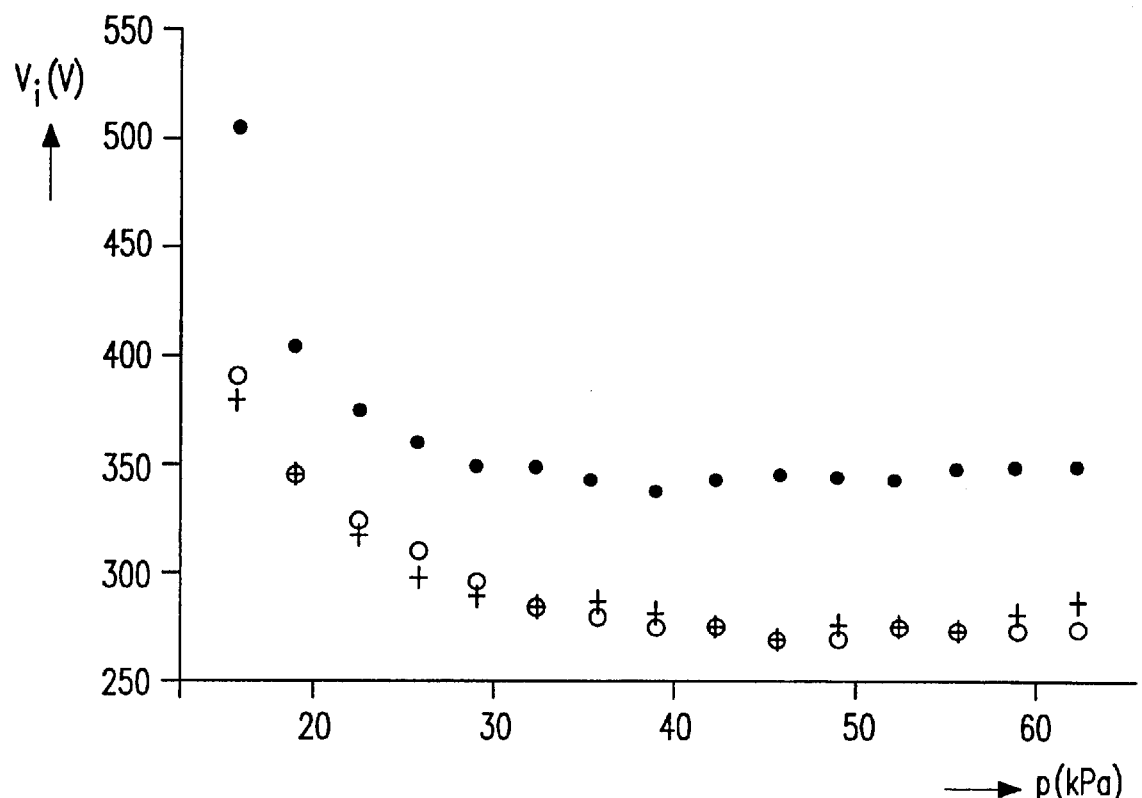
FIG. 3 shows the ignition voltage $V_i$ as a function of the gas pressure p for a compartment filled with different helium mixtures.

Dependent upon the electrode material used, the addition of 0.2% nitrogen to helium leads to a reduction of the ignition voltage by 50–100 V. A comparable addition of xenon to helium leads, in dependence upon the electrode material used, to a reduction of the ignition voltage by 100–150 V. In FIG. 3, the ignition voltage $V_i$ (V) is plotted as a function of the gas pressure p (kPa) for a compartment filled with He (filled circles), with He and 0.2% $H_2$ (open circles), and with He and 0.2% $D_2$ (crosses). In both cases, the addition of hydrogen and deuterium to helium leads to a reduction of the ignition voltage by approximately 75 V relative to pure helium.

Figure 4:
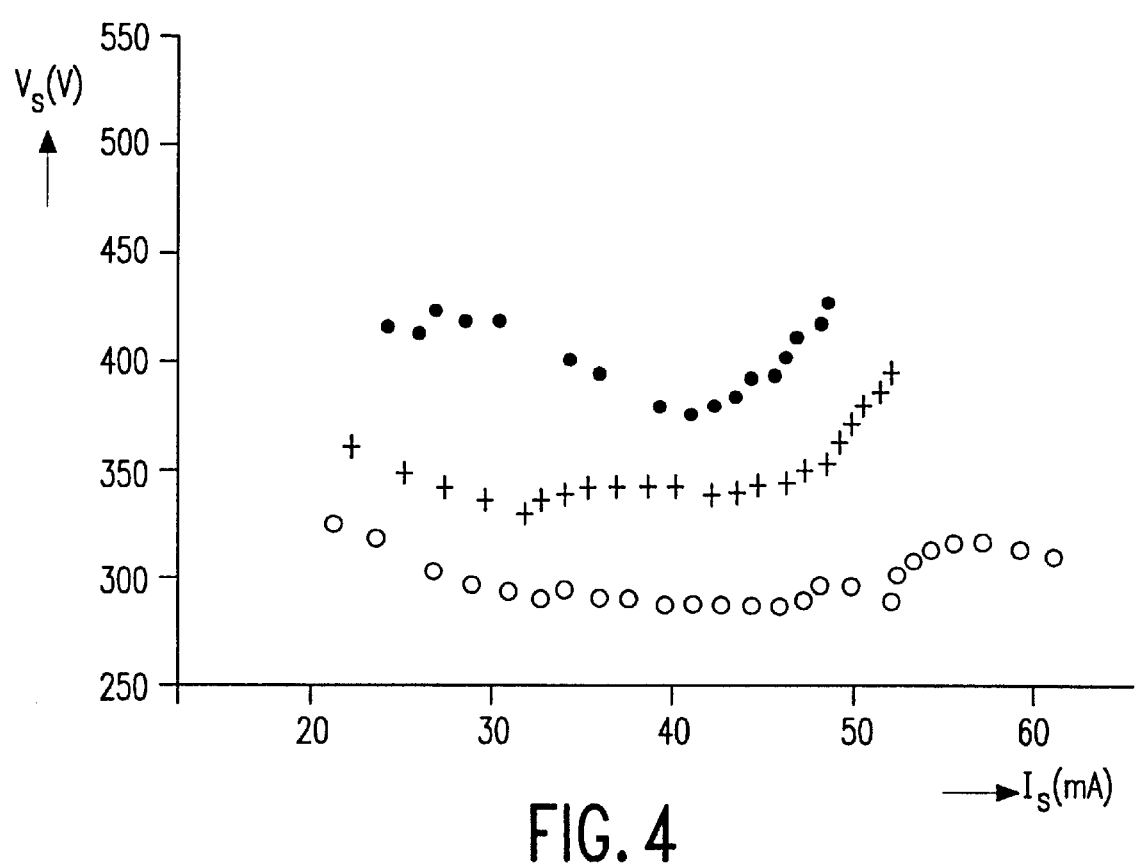
FIG. 4 shows the plasma sustain voltage $V_s$ as a function of the sustain current $I_s$ for a compartment filled with different helium mixtures.

In FIG. 4, the plasma-sustain voltage $V_s$ (V) is plotted as a function of the sustain current $I_s$ (mA) for a compartment filled with He (filled circles), with He and 0.1% $H_2$ (open circles), and with He and 0.1% $D_2$ (crosses). FIG. 4 shows that the addition of $D_2$ and, in particular, $H_2$ causes a reduction of the sustain voltage $V_s$.

Figure 5:
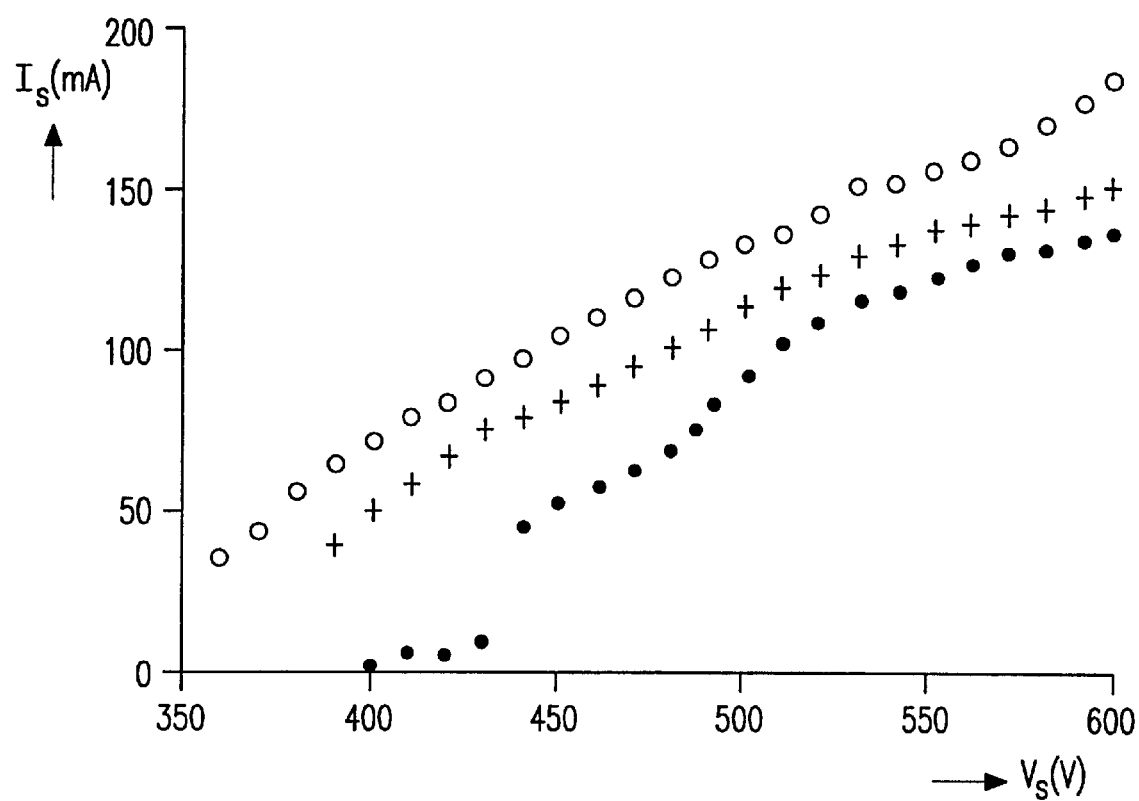
FIG. 5 shows the plasma sustain current $I_s$ as a function of the pulse voltage $V_s$ for a compartment filled with different helium mixtures.

In FIG. 5, the plasma-sustain current $I_s$ (mA) is plotted as a function of the pulse voltage $V_5$ (V) for a compartment filled with He (filled circles), with He and 0.1% $H_2$ (open circles), and with He and 0.1% $D_2$ (crosses). By representing the results in this manner, the conditions under which the most efficient plasma discharge is achieved are visualized. In general, a discharge is, efficient if a low overall power $I_s \cdot V_s$ is dissipated at a high plasma-sustain current $I_s$, in other words, if a low pulse voltage $V_s$ is sufficient to generate a high plasma-sustain current. FIG. 5 shows that the addition of hydrogen leads to a more efficient plasma than the addition of deuterium, which can be attributed to the difference in the drift and diffusion rates of the ions of both substances.

However, the addition of different gases to helium does not only influence the ignition and sustain voltages of the plasma discharge but, in general, also the afterglow decay time τ of the plasma discharge. In this application, "afterglow decay time" is to be taken to mean the time period in which the conductivity of the plasma has decreased by a factor of 1/e.

Table II shows the afterglow decay time for different He mixtures at a pulse voltage across the electrodes in the compartment of $V_s$=400 V for a He—Xe mixture, and of $V_s$=500 V for He—$N_2$, He—$H_2$ and He—$D_2$ mixtures and an overall gas pressure of 25<p<30 kPa.

TABLE II

Afterglow decay times τ (µs) for different He mixtures

| concentration (%) | $N_2$ | Xe | $H_2$ | $D_2$ |
|---|---|---|---|---|
| 0 | 1.8 µs | 1.8 µs | 1.8 µs | 1.8 µs |
| 0.1 | 1.2 | 1.2 | 1.0 | 1.7 |
| 0.2 | 1.0 | 0,9 | 0.6 | 1.1 |
| 0,5 | 0.4 | 0.8 | 0.2 | 0.4 |

Table II shows that, in particular, the addition of $H_2$ has a substantial influence on the afterglow decay time of the plasma, which can be attributed to the so-called Penning reactions. The afterglow decay time is predominantly determined by the presence of meta-stable particles and the decay thereof. In pure He, charged particles are created in the afterglow by a reaction between two meta-stable particles. If, for example, $N_2$ is added to He, the charged particles are created by a reaction between a He meta-stable particle and an $N_2$ molecule. Said reaction (Penning reaction) takes place much more rapidly than the reaction between two meta-stable particles. As a result, the charged particles can recombine or they lose their charge more rapidly at the walls of the compartment, thus causing a reduction of the afterglow decay times. Table II further shows that the afterglow decay time τ is longer if $D_2$ is used instead of $H_2$. This is caused by the larger molar mass of $D_2$, which causes the diffusion of $D_2^-$ and D-ions to be slower than that of $H_2^-$ and H-ions.

A disadvantage of a gas mixture comprising helium as the carrier gas and $H_2$ as the additional gas is that the afterglow decay times become very short (less than 1.0 µs) (see Table II). As the selection of the transparency of the electro-optical layer requires a good definition of the voltage of the electrode, it is important that this defined voltage is achieved while the discharge still demonstrates a charge. This means that in the case of very short afterglow decay times, also the voltage on the electrodes has to be switched very rapidly, which, in general, is difficult to achieve. The addition of $N_2$ to such a gas mixture causes the afterglow decay times to be extended again, so that the afterglow decay time has a greater tendency to fall within the desired range. In general, the use of more than one additional gas leads to further possibilities of improving the plasma-discharge cycle. The addition of $N_2$ or Xe to an additional gas which already contains $H_2$ provides those skilled in the art with an additional "knob" (setting possibility), as it were, to fine tune the properties of the plasma discharge cycle. In this manner, also suitable gas mixtures can be obtained by using hydrogen and deuterium, or hydrogen and deuterium hydrogen as the additional gas.

It will be obvious that within the scope of the invention many variations are possible to those skilled in the art.

In general, the invention relates to a display device comprising channels (30, 30', 30") containing an ionizable gas (33), and walls of the channels being provided with row electrodes (31, 32) for selectively ionizing the ionizable gas (33), during operation. The display device is further provided with an electro-optical layer (35) and means for activating said electro-optical layer. The display device is characterized in that the ionizable gas (33) contains a carrier gas and an additional gas, said additional gas comprising deuterium or deuterium hydrogen, or hydrogen and a further gas having a higher molecular weight. Preferably, helium or nitrogen is used as the carrier gas, and the additional gas comprises deuterium or deuterium hydrogen, or hydrogen and nitrogen, or hydrogen and xenon.

What is claimed is:

1. A display device comprising:
   a plurality of elongated compartments (30, 30', 30") each containing an ionizable gas (33), walls of each of the compartments (30, 30', 30") being provided with respective electrodes (31, 32) for selectively ionizing the ionizable gas (33) thereby forming a plasma discharge in the respective compartments during operation, each compartment defining a respective dimension of at least one pixel,
   an electro-optical layer (35) of an electro-optical material which, in response to application of a voltage across the material, attenuates transmitted or reflected light, and
   means for activating the electro-optical layer (35),
   characterized in that, to influence at least one of the ignition characteristics, sustain current characteristics, and afterglow characteristics of the plasma discharge, the ionizable gas (33) comprises a carrier gas and an additional gas comprising, a gas selected from the group consisting of deuterium and deuterium hydrogen.

2. A display device as claimed in claim 1, characterized in that the carrier gas is a member selected from the group consisting of helium and nitrogen.

3. A display device as claimed in claim 2, characterized in that the additional gas further comprises at least one gas selected from the group consisting of nitrogen and xenon.

4. A display device as claimed in claim 1, characterized in that the carrier gas is helium, and the additional gas comprises hydrogen and nitrogen, or hydrogen and xenon.

5. A display device as claimed in claim 1, characterized in that the carrier gas is helium.

6. A display device as claimed in claim 1, characterized in that the additional gas additionally comprises at least one gas selected from the group consisting of hydrogen, nitrogen and xenon.

7. A display device as claimed in claim 6, characterized in that the carrier gas is helium.

8. A plasma-addressed display device having a pattern of pixels, comprising:
- a plurality of elongated compartments (30, 30', 30") formed in a channel plate, each of said compartments containing an ionizable gas (33), walls of each of the compartments (30, 30' 30") being provided with respective electrodes (31, 32) for selectively ionizing the ionizable gas (33) in the respective compartment during operation to form a plasma discharge, each compartment defining a respective dimension of at least one of said pixels,
- an electro-optical layer (35) of an electro-optical material which, in response to application of a voltage across the material, attenuates transmitted or reflected light, and
- means for activating the electro-optical layer (35), said means comprising a plurality of electrodes each defining a respective other dimension of at least one of said pixels, characterized in that, to influence at least one of the ignition characteristics, sustain current characteristics and afterglow characteristics of the of the plasma discharge, the ionizable gas (33) comprises a carrier gas and an additional gas comprising, a gas selected from the group consisting of deuterium and deuterium hydrogen.

9. A display device as claimed in claim 2, characterized in that the carrier gas is helium or nitrogen.

10. A display device as claimed in claim 9, characterized in that the additional gas further comprises at least one gas of the group formed by nitrogen and xenon.

11. A display device as claimed in claim 2, characterized in that the carrier gas is helium, and the additional gas comprises hydrogen and nitrogen, or hydrogen and xenon.

12. A display device as claimed in claim 2, characterized in that the carrier gas is helium.

13. A display device as claimed in claim 2, characterized in that the additional gas additionally comprises at least one gas selected from the group consisting of hydrogen, nitrogen and xenon.

14. A display device as claimed in claim 13, characterized in that the carrier gas is helium.

\* \* \* \* \*